United States Patent [19]

Matz et al.

[11] Patent Number: 4,816,199

[45] Date of Patent: Mar. 28, 1989

[54] METHOD OF DIMENSIONALLY STABILIZING POLYSTYRENE PATTERNS AND THE LIKE

[75] Inventors: Bruno Matz, Milford; Dolores C. Kearney, Inkster, both of Mich.

[73] Assignee: Ford Motor Company, Dearborn, Mich.

[21] Appl. No.: 926,754

[22] Filed: Nov. 4, 1986

[51] Int. Cl.4 .......................... C08J 9/22; B29C 67/04
[52] U.S. Cl. ...................................... 264/53; 264/101; 264/DIG. 9; 264/DIG. 15; 425/4 R
[58] Field of Search ................. 264/53, 101, DIG. 15, 264/51, 48, DIG. 9; 425/4 R

[56] References Cited

U.S. PATENT DOCUMENTS

| | | | |
|---|---|---|---|
| 3,015,851 | 1/1962 | Wiles | 264/101 X |
| 3,086,248 | 4/1963 | Culp | 264/101 X |
| 3,278,658 | 10/1966 | Immel | 264/101 X |
| 3,452,124 | 6/1969 | Knapp | 264/53 |
| 3,822,331 | 7/1974 | Cogliano | 264/51 |

OTHER PUBLICATIONS

Immel, R. H. "Expandable Polystyrene and its Processing into Patterns for the Evaporative Casting Process", In *American Foundrymen's Society Transactions*, vol. 87, 1979, pp. 545–550.

*The Condensed Chemical Dictionary*, Tenth Edition, revised by Gessner G. Hawley, New York, Van Nostrand Reinhold, c1981, pp. 156, 157, 784.

*Primary Examiner*—Philip Anderson
*Attorney, Agent, or Firm*—Joseph W. Malleck; Roger L. May

[57] ABSTRACT

A method is disclosed of making dimensionally stable, expanded polystyrene foam patterns comprising: (a) expanding a supply of beads comprised of polystyrene and a thermally responsive expanding agent, the expansion being accomplished in one or more stages by use of a gaseous heating agent (steam) to define a fused pattern body of the expanded beads, and (b) subjecting the fused pattern body to subatmospheric pressure (in the range of 5-20" of Hg) for a period of about 0.5-6 hours but no more than sufficient to accelerate and complete the migration of the trapped expanding agent out of the pattern body. The expanding agent can be selected from the group consisting of various forms of pentane or butane.

7 Claims, 1 Drawing Sheet

METHOD OF DIMENSIONALLY STABILIZING POLYSTYRENE PATTERNS AND THE LIKE

BACKGROUND OF THE INVENTION

1. Field of the Invention

The invention relates to the art of making consumable foam type patterns for metal casting and, more particularly, to making dimensionally accurate polystyrene patterns from expanded polystyrene beads and the like.

2. Description of the Prior Art

A recently commercialized method of making metal castings is commonly called the evaporative casting process (ECP). In such process, a plastic foam pattern is embedded in a dry sand mold and molten metal is poured into the mold to evaporate and displace the pattern, the gases of evaporation migrating through the sand mold.

A commercialized method of making foam patterns for use in ECP usually involves (i) preparing beads (about the size of salt grains) of polystyrene and a thermal expanding agent such as pentane, (ii) heating the beads in a large bulk container to a temperature of about 215° F. to preexpand such beads to form grains of a density of about 0.9-1.9 pounds per cubic foot, (iii) transferring the preexpanded pellets to fill a pattern mold equipped with cold water and steam plumbing, the pellets being heated for about one minute by steam at a temperature of about 215° F. to expand, soften, distort and merge together to form a unitary foam pattern defined by the mold walls, and (iv) stopping the expansion process by running cold water through the mold and removing the pattern from the mold for storage at ambient conditions.

Such a mold pattern, during storage or post-curing, will shrink for several days (up to 28-30 days) in an amount of about 0.004-0.008 inch/inch. This is due to the slow outward migration of residual expanding agent (trapped in each bead) from the foam pattern, thus changing the pressure condition of the pattern structure and necessitating some contraction. This is disadvantageous because, in a high volume casting line, the unduly long storage of such patterns interrupts production; also, the application of a ceramic coating to such patterns, which is needed for the casting process, must be inordinately postponed.

Such polystyrene patterns have also been made by alternative methods, such as by heating the polystyrene beads to about 215° F., the beads being prepared with an internal expansion agent. High pressure compressed air (about 10 pounds per square inch) is imposed upon the heating chamber to prevent expansion of the beads until a precise moment at which the collapse of such compressed air is brought about by the use of a vacuum to permit rapid expansion. There is insufficient time dwell to permit the extraction of trapped gases from the expanded beads and thus post-curing is necessary (see U.S. Pat. No. 3,452,124).

In another prior art technique, vacuum was used for a few seconds to allow for the expansion of the polystyrene beads—containing a foaming agent other than an expansion agent. The expansion was through a die to form solid strands or tubes of the polystyrene material. Again, the exposure of the vacuum, solely for purposes of expansion of the foaming-type beads, is insufficiently long to permit extraction of the trapped gases within the expanded foam. The vacuum has always been removed upon attainment of the shaped form, still requiring post-curing (see U.S. Pat. No. 3,822,331).

The common denominator for all of the above prior art modes is the practice of the curing (which must take place by way of shelf storage) at atmospheric conditions; this takes a minimum of seven days.

It would be helpful if some mode were devised to allow for rapid extraction of residual expanding agents without having the pattern out of the production line for any significant length of time.

SUMMARY OF THE INVENTION

It is a primary object of this invention to rapidly dimensionally stabilize an expanded polystyrene body without affecting the physical characteristics of the body.

It is particularly desirable to stabilize a polystyrene pattern expanded by a thermally responsive chemical agent in a time period of about 0.5-6 hours.

The invention is a method to achieve the above objects, and comprises: (a) expanding a supply of beads comprised of a polystyrene base (50% or more by weight) and a thermally responsive expanding agent, said expansion being accomplished in one or more stages by use of a gaseous heating agent (steam) to define a fused body of said expanded beads, and (b) subjecting the fused body to subatmospheric pressure in the range of 5-20" of Hg for a period of at least 0.5 hours but no more than sufficient to accelerate and complete the migration of the trapped expanding agent out of said body as well as any trapped gaseous heating agent (steam).

Preferably the expanding agent is selected from the group consisting of various forms of pentane butane, which is preferrably present in the raw polystyrene beads in an amount of up to 7% by weight thereof. It is preferable that the expansion of said beads in step (a) be carried out in two stages, including a preexpansion stage whereby the beads are subjected to steam at a temperature in the range of 200°-220° F. for a period of 1½ to 2½ minutes to decrease the density of said beads to the range of 0.9-1.9 pounds per cubic foot, and the final expansion stage comprising heating by use of steam in a chamber filled with said preexpanded beads, to a temperature again in the range of 200°-220° F., for a time of about one minute to complete the fusion of said body.

DETAILED DESCRIPTION AND BEST MODE

Figure 1:
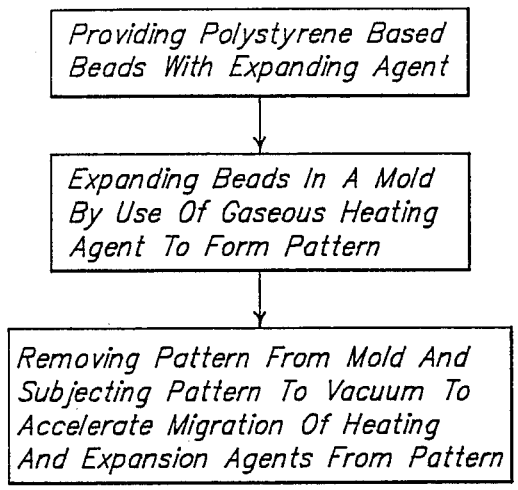
FIG. 1 is a flow diagram of the process.
Figure 2:
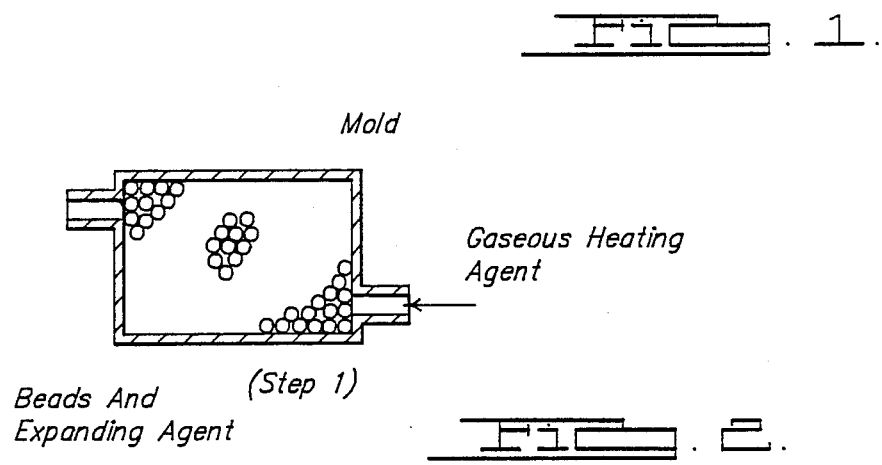
FIG. 2 is a schematic illustration of apparatus used to carry out step one.
Figure 3:
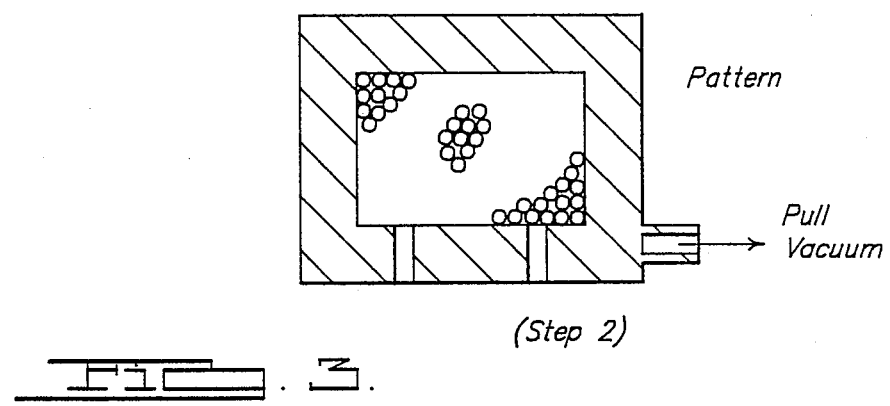
FIG. 3 is a schematic illustration of apparatus used to carry out step two.

The method of this invention for making dimensionally stable expanded polystrene foam patterns comprises: (a) expanding a supply of beads comprised of polystyrene and a thermally responsive expanding agent, the expansion being accomplished in one or more stages to define a fused pattern body of the expanded beads, and (b) subjecting the fused pattern body to subatmospheric pressure in the range of 5-20" of Hg for a period of at least 0.5 hours but no more than sufficient to accelerate and complete the migration of the trapped expanding agent out of the body (i.e., about 0.5-6 hours).

Materials

The polystyrene beads are formed in accordance with procedure outlined in the article entitled "Expandable Polystyrene and Its Processing into Patterns For the Evaporative Casting Process" by R. H. Immel, American Foundrymen's Society Transactions, Vol. 87, 1979 (this article is incorporated herein by reference). In this article polystyrene and a thermally responsive expanding agent are mixed and coagulated to form beads having an average particle size in the range of 0.012–0.017 inch (about the size of salt grains), a density in the range of 37–43 pounds per cubic foot, and purity of 99+%. The expanding agent is preferably selected from the group consisting of various forms of pentane or butane. However, other suitable expanding agents will be apparent to those skilled in the art. Suitable expanding agents are characterized by (i) the size of gas molecule which has to fit through the pore size of the foam, and (ii) the ability not to flash off or explode at the expansion temperature (215° F.). The expanding agent is preferably present in the polystrene beads in an amount of at least 5% preferably about 6% by weight of the polystyrene beads.

Expansion

The beads are subjected to a two-stage expansion process, the first of which includes a preexpansion stage whereby the beads are subjected to a steam temperature in the range of about 200°–220° F. for a period of about 1½ to 2½ minutes to decrease the density of the beads to the range of about 0.9–1.9 pounds per cubic foot. Preferably the temperature is about 215° F., and the period of exposure is preferably for about two minutes.

The preexpanded beads are then air-transferred to another container such as a metal pattern mold equipped with cold water and steam plumbing. The preexpanded pellets are then heated within such mold for about one minute by steam at a temperature in the range of 200°–220° F. for a period of about one minute to complete the fusion of the pellets together as a solidified pattern body or unitary foam pattern, as defined by the mold walls. Preferably the wall temperature is about 215° F. and the period of exposure to steam is about one minute. The expansion process is stopped by running cold water through the mold and removing the pattern from the mold.

Exposure to Subatmospheric Pressure

The pattern is removed from the mold and placed in a vacuum chamber to dimensionally stabilize the foam pattern configuration. This stabilization occurs rapidly because (a) through the molding process, the expanding agent inside the bead is pressurized; (b) the expanding agent inside each polystyrene bead can escape through its permeable membrane surface and be replaced by air present in the vacuum; and (c) this differential in pressure causes the expanding agent to flow through the membrane surface of the bead until pressure equalization is achieved. The pressure differential is increased by the use of a vacuum in the pressure range of about 5–20 inches of mercury; it is subjected to such vacuum for a period of about 0.5–6 hours, preferably two hours, to cause this air exchange and thereby shrinkage and stabilization of the foam pattern. The shrinkage should be normally in the range of about 0.004–0.008 inch/inch, depending on the foam density, expanding agent and part thickness. The period of exposure should not be less than about ½ hour because there will be insufficient air exchange; the period should not be greater than about six hours because of the inefficiency of such procedure.

EXAMPLES

Several examples were processed whereby each foam pattern was prepared in accordance with the preferred mode. The polystyrene beads contained a thermally responsive expanding agent (5% by weight of the beads) in the form of pentane in most examples and butane in one example. The beads were prepared to have a density of 40 pounds per cubic foot, a particle size of 0.014 inch, and purity of 99+%. The beads were subjected to a two-stage expansion procedure as outlined in the preferred mode. To corroborate the advantages of the present invention, the subatmospheric exposure procedure (at generally room temperature) was varied as illustrated in Table 1, exploring such variables as the amount of vacuum, method of expansion utilizing either (i) high steam (which produces 15–16% by weight moisture (water) in the molded part), or (ii) low steam (which produces 5–6% moisture in the molded part), part configurations (thin 0.18–0.19" sections or thick 1–2" sections), density (low 0.9–1.4 or high 1.6–1.9), and the time period during which the foam pattern was subjected to the vacuum. The foam patterns, after vacuum treatment, were tested to determine the amount of shrinkage that took place during the vacuum treatment and the shrinkage that took place after the vacuum treatment was terminated. The results of such variations are shown in Table 1. All of the examples, except 5 and 9, were processed in accordance with all the characteristics as required of this invention, and demonstrated that a shrinkage in the range of 0.004–0.008 inch per inch takes place during the vacuum treatment and that there is essentially no shrinkage thereafter while stored for up to thirty days. However, as shown by example 5, when the vacuum applied was less than 5" Hg (here it was 2" Hg), although for an equivalent time period as that of example 9, the shrinkage was considerably less during the vacuum treatment allowing for shrinkage to take place during the storage period. Examples 1 and 2 demonstrate the effect of degree of vacuum when used on a thin, low density part and high steam; vacuum pressures of 10" or more of Hg tend to distort the part during short periods of exposure. When the part configuration is thick (example 4) it then can withstand greater vacuum pressures, allowing the exposure time to be reduced. Examples 2 and 3 demonstrate the effect of high or low steam on similar part configurations and density. Examples 6 and 7 demonstrate the effect of low or high density and high or low vacuum pressure, respectively, permitting respectively shorter and longer exposure times. Example 8 demonstrates the effectiveness of the process with butane as an expanding agent. Example 8 demonstrated that use of too short of an exposure time during the vacuum treatment results in less shrinkage, allowing for greater shrinkage during the storage stage following such treatment. If the exposure time is too great, it will result in adequate shrinkage during the vacuum treatment but at an inefficiency penalty.

This invention eliminates the problem of water defects in metal castings due to residual moisture being present in the pattern. Water is originally present in expanded foam patterns as a result of the bead expansion process which uses steam. Water comes out of the foam pattern much faster under vacuum then pentane or butane, thus assuring the absence of water. The degree of water content in the pattern is an important parameter in evaluating the stabilizing process, since water prevents the expanding agent from migrating out as fast as it would without water present.

While particular examples of the invention have been illustrated and described, it will be obvious to those skilled in the art that various changes and modifications may be made without departing from the invention, and it is intended to cover in the appended claims all such changes and modifications that fall within the true spirit and scope of this invention.

TABLE I

| Example | Expanding Agent | Method of Expansion | Part Configuration | Density of Foam | Vacuum (Pressure) Inch of Hg | Time of Vacuum Exposure | Shrinkage Due To Vacuum Treatment (in/in) | Shrinkage After Vacuum Treatment (in/in) |
|---|---|---|---|---|---|---|---|---|
| 1 | pentane | high steam | thin | low | 5-6" | 1.25 hrs. | .006 | none |
| 2 | " | " | " | " | 12" | .8 hr. | .006 | " |
| 3 | " | low steam | " | " | 5" | .75 hr. | .004 | " |
| 4 | " | " | " | " | 20" | .5 hr. distortion after .5 hr. | .004 | " |
| 5 | " | high steam | " | " | 2" | 6 hrs. | .002 | .004 |
| 6 | " | " | thick | " | 17" | 2 hrs. | .008 | none |
| 7 | " | " | " | high | 6" | 6 hrs. | .006 | " |
| 8 | butane | " | " | low | 9" | 1.0 hr. | .008 | " |
| 9 | pentane | low steam | thin | low | 8" | .2 hr. | .001 | .005 |

We claim:

1. A method of making dimensionally stable, expanded polystyrene foam patterns, comprising:
   (a) expanding in a mold a supply of beads comprised of a polystyrene base and a thermally responsive expanding agent, said expansion being accomplished by use of a gaseous heating agent to define a fused pattern body of said expanded beads; and
   (b) removing said body from said mold and subjecting said fused body to subatmospheric pressure in the range of 5-20" of Hg for a period of at least 0.5 hours but no more than sufficient to accelerate and complete the migration of the trapped expanding agent and heating agent out of said body.

2. The method as in claim 1, in which said expanding agent is selected from the group consisting of various forms of pentane or butane and said gaseous heating agent is steam.

3. The method as in claim 2, in which said steam is used in a quantity to impart 5-8% by weight water of the molded part and the time of said subjection to subatmospheric pressure is in the range of 0.5-2 hours.

4. The method as in claim 1, in which said expanding agent is present in said polystyrene beads in an amount up to 7% by weight of the polystyrene beads.

5. The method as in claim 2, in which said steam is used in a quantity to impart 10-16% by weight water to the molded part and the time of said subjection to subatmospheric pressure is in the range of about 1-6 hours.

6. The method as in claim 1, in which said beads are subjected to a preexpansion stage prior to step (a) whereby the beads are subjected to a temperature in the range of 200°-220° F. for a period of 1½ to 2½ minutes to decrease the density of said beads to the range of 0.9-1.9 pounds per cubic foot, and step (a) comprises heating a filled mold of said preexpanded beads to a temperature again in the range of 200°-220° F. for a period of about one minute to complete the fusion of said pattern body.

7. The method as in claim 1, in which the density of said fused body is in the range of 0.9-1.2 pounds/ft.$^3$ and the time of said subjection to subatmospheric pressure is in the range of 0.5-2.25 hours.

* * * * *